United States Patent
Akiyama et al.

(10) Patent No.: US 7,382,979 B2
(45) Date of Patent: Jun. 3, 2008

(54) WAVELENGTH DISPERSION COMPENSATION DESIGN METHOD AND A SYSTEM THEREOF

(75) Inventors: Yuichi Akiyama, Kawasaki (JP); Takafumi Terahara, Kawasaki (JP); Takeshi Hoshida, Kawasaki (JP); Hisao Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/316,961

(22) Filed: Dec. 27, 2005

(65) Prior Publication Data

US 2006/0193638 A1    Aug. 31, 2006

Related U.S. Application Data

(63) Continuation of application No. PCT/JP03/08797, filed on Jul. 10, 2003.

(51) Int. Cl.
*H04B 10/08* (2006.01)
*H04B 10/12* (2006.01)
*H04B 10/00* (2006.01)
*H04J 14/02* (2006.01)

(52) U.S. Cl. .................... 398/25; 398/29; 398/81; 398/147; 398/159

(58) Field of Classification Search ............... 398/25, 398/28, 29, 81, 147, 158, 159; 703/21, 22
See application file for complete search history.

(56) References Cited

U.S. PATENT DOCUMENTS

| 6,324,317 B1 | 11/2001 | Tanaka et al. | |
| 6,782,159 B2* | 8/2004 | Ng ........................ | 385/24 |
| 7,096,176 B1* | 8/2006 | Hess ...................... | 703/21 |
| 2003/0099014 A1* | 5/2003 | Egner et al. ........ | 359/124 |
| 2005/0175279 A1* | 8/2005 | Nakajima et al. ...... | 385/24 |
| 2006/0067694 A1* | 3/2006 | Nozu .................... | 398/83 |

FOREIGN PATENT DOCUMENTS

| JP | 11-344768 | 12/1999 |
| JP | 2000-261376 | 9/2000 |
| JP | 2001-160781 | 6/2001 |
| JP | 2002-117422 | 4/2002 |
| JP | 2003-121303 | 4/2003 |

* cited by examiner

*Primary Examiner*—Dalzid Singh
(74) *Attorney, Agent, or Firm*—Staas & Halsey LLP

(57) ABSTRACT

The present invention discloses a design method of wavelength dispersion compensation of a desired link that is extracted from an optical network, the link including two or more spans, and two or more nodes (N1, N4) that are equipped with an add/drop function, as shown in FIG. 2. All residual dispersion ranges of paths that reach corresponding nodes are adjusted to fall within predetermined tolerable residual dispersion ranges that are set up for all the paths of the link by adjusting wavelength dispersion compensators provided to each of the spans.

11 Claims, 15 Drawing Sheets

FIG.8

| TRANSMISSION LINE NUMBER OF RELAY SECTION (SPAN) | 1 | 2 | 3 |
|---|---|---|---|
| WAVELENGTH DISPERSION AMOUNT Df(n) (ps/nm) | 500 | 600 | 700 |

FIG.9

| PATH NUMBER | ① | ② | ③ | ④ | ⑤ | ⑥ |
|---|---|---|---|---|---|---|
| TRANSMISSION SECTION | 0→3 | 0→2 | 0→1 | 1→3 | 1→2 | 2→3 |
| RD_tol_max (ps/nm) | 400 | 300 | 200 | 300 | 200 | 200 |
| RD_tol_min (ps/nm) | 0 | -300 | -600 | -300 | -600 | -600 |
| $\sigma_\lambda$_max (ps/nm) | 100 | 50 | 25 | 50 | 25 | 25 |
| $\sigma_\lambda$_min (ps/nm) | 100 | 50 | 25 | 50 | 25 | 25 |
| $\sigma$ (ps/nm) | 40 | 40 | 40 | 40 | 40 | 40 |

WAVELENGTH DISPERSION COMPENSATION DESIGN METHOD AND A SYSTEM THEREOF

CROSS-REFERENCE TO RELATED APPLICATION

This application is a U.S. continuation application filed under 35 USC 111(a) claiming benefit under 35 USC 120 and 365(c) of PCT application JP2003/008797, filed Jul. 10, 2003. The foregoing application is hereby incorporated herein by reference.

BACKGROUND OF THE INVENTION

1. Field of the Invention

The present invention generally relates to a wavelength dispersion compensation design method, and a system thereof; and especially relates to a wavelength dispersion compensation design method for compensating for a wavelength dispersion generated in an optical transmission system, and a design system thereof.

2. Description of the Related Art

When planning a wavelength division multiplexing (WDM) optical transmission system with a transmission speed of 10 Gbps, it is required that an optical network be designed at low cost in a short period, the importance of which will increase with a WDM optical transmission system with 40 Gbps of transmission speed, or even higher.

Generally, a wavelength dispersion compensator is used by a relay section (span) of the WDM transmission system such that degradation of a waveform due to wavelength dispersion in the transmission line is compensated for. Amounts of wavelength dispersion compensation differ from system to system.

In an optical transmission system where the transmission speed is 10 Gbps or higher per wavelength, the wavelength dispersion compensator is used in the span of the system such that degradation of signal properties due to the wavelength dispersion generated in the transmission line may be compensated for.

When designing wavelength dispersion compensation, a predetermined amount of transmission degradation is tolerated in each span, and an amount of wavelength dispersion compensation is set up so that waveform degradation due to wavelength dispersion may fall within the predetermined transmission degradation. For example, a Q value is defined as an index of a transmission characteristic, and 1 dB of degradation is tolerated in terms of the Q value.

Here, the amount of wavelength dispersion compensation has a tolerance in a transmission section (path) of each transmission signal, and the difference between the amount of wavelength dispersion of the transmission section and the amount of wavelength dispersion compensation that is within the tolerance is made into a tolerable residual dispersion range. That is, a signal transmission at a guaranteed transmission characteristic is attained by designing the network so that wavelength dispersion may fall within the tolerable residual dispersion range (the amount of wavelength dispersion is compensated for so as to be within the tolerable residual dispersion range).

Here, there is a point that should be taken into consideration in designing the wavelength dispersion compensation. In the case of a point-to-point system that does not include an optical add/drop (OADM) function, wherein a signal is input only from a transmitting station and is output to a receiving station, what is necessary is to adjust the amount of wavelength dispersion compensation at the last transmission section on the side of the receiving station so that the amount of wavelength dispersion may fall within the tolerable residual dispersion range of the system.

However, in the case of a system including the OADM function, the amount of wavelength dispersion compensation in each relay section has to be arranged such that an adequate signal transmission may be attained within the tolerable residual dispersion range in every path of the link that is the design target section, given that the signal may be added/dropped in a node having the OADM function in the system.

Further, in order to determine the amount of wavelength dispersion compensation for each relay section at this time, the fact that the tolerable residual dispersion range varies with a self-phase modulation (SPM) generated by the optical input power to the transmission line has to be taken into consideration. That is, even if transmission lines have the same relay section length and the same amount of wavelength dispersions, the tolerable residual dispersion ranges may differ if optical input power is different.

Conventional technologies disclose methods of optimizing the amount of wavelength dispersion compensation of a certain given system in consideration of the above described problems. For example, Patent Reference 1 discloses a method of designing the amount of wavelength dispersion compensation of all spans concerning a point-to-point system equipped with the OADM function.

Further, Patent Reference 2 and Patent Reference 3 disclose point-to-point system configurations.

Patent reference 1 JPA 2002-117422
Patent reference 2 JPA 11-344768
Patent reference 3 JPA 2000-261376

However, the Patent References disclose an application only to a given point-to-point long-distance WDM transmission system. That is, a method of optimizing the amount of the wavelength dispersion compensation for any desired point-to-point transmission systems and metro systems of a ring structure is not available in a commonly applicable and formulized manner. For this reason, when designing an optical network, various design methods have to be used depending on link form, making it difficult to design the network in a short period.

SUMMARY OF THE INVENTION

The present invention provides a wavelength dispersion compensation design method, and a system thereof, which are capable of providing a commonly applicable and formulized method and system of optimizing wavelength dispersion compensation of point-to-point transmission systems and ring-structured systems, substantially obviating one or more of the problems caused by the limitations and disadvantages of the related art.

Features of the present invention are set forth in the description that follows, and in part will become apparent from the description and the accompanying drawings, or may be learned by practice of the invention according to the teachings provided in the description. Problem solutions provided by the present invention will be realized and attained by a wavelength dispersion compensation design method, and a system thereof particularly pointed out in the specification in such full, clear, concise, and exact terms as to enable a person having ordinary skill in the art to practice the invention.

To achieve these solutions and in accordance with the purpose of the invention, as embodied and broadly described herein, the invention provides a wavelength dispersion compensation design method, and a system thereof as follows.

The wavelength dispersion compensation design method of the present invention is applicable to any desired links containing two or more spans extracted out of an optical network, and two or more nodes that include an add/drop function, wherein an amount of wavelength dispersion compensation of a wavelength dispersion compensator that is included in each path is set up such that all the residual dispersion ranges of paths that reach the nodes may fall within a tolerable residual dispersion range for each path of the link as conditions for the network being serviceable.

According to the wavelength dispersion compensation design method, a commonly applicable and formulized method of optimizing the amount of wavelength dispersion compensation is realized for a point-to-point transmission system and a ring-structured system, thereby shortening the design time.

BRIEF DESCRIPTION OF THE DRAWINGS

FIG. 8 is a table showing an amount of wavelength dispersion at a base wavelength in a transmission line of each span.

FIG. 9 is a table showing the tolerable residual dispersion range, an error due to a dispersion slope, and distribution due to temperature drift and manufacturing tolerance of transmission line and dispersion compensators, etc.

DESCRIPTION OF THE PREFERRED EMBODIMENTS

In the following, embodiments of the present invention are described with reference to the accompanying drawings.

Figure 1:
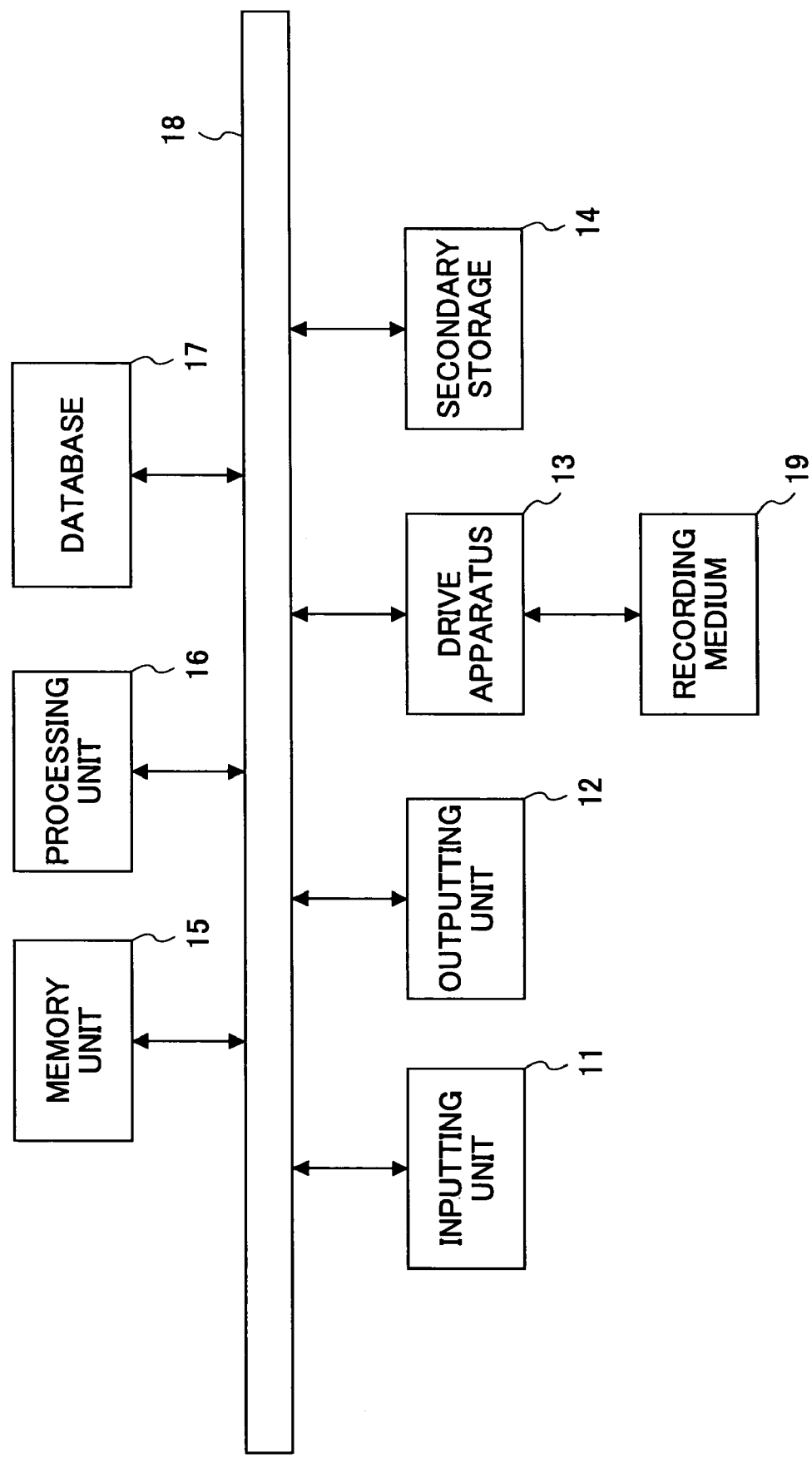
FIG. 1 is a block diagram of hardware of a wavelength dispersion compensation design system according to an embodiment of the present invention.

FIG. 1 shows a hardware configuration of the wavelength dispersion compensation design system (the system) according to the embodiment of the present invention. While the system can be configured as a stand-alone system, a general-purpose personal computer, a workstation, etc., can serve as the system.

As shown in FIG. 1, the system includes an inputting unit 11, an outputting unit 12, a drive apparatus 13, a secondary storage 14, a memory unit 15, a processing unit 16, and a database 17, all of which are mutually connected by a system bus 18.

The inputting unit 11 includes a keyboard, a mouse, etc., for a user to operate, and is for inputting various data. The outputting unit 12 includes a display for displaying various windows, data, and the like required when operating a program of the system, and is displayed based on a computer-executable program. Here, in the present invention, the program is installed in the system from a recording medium 19 such as a CD-ROM. The recording medium 19 is mounted in the drive apparatus 13 such that the program stored in the recording medium 19 is installed in the secondary storage 14 through the drive apparatus 13.

The processing unit 16 is for controlling the operations of the system, the operations including various calculations and processes as described below based on the program that is read into and temporarily stored by the memory unit 15. Further, various information items required for executing the program can be acquired from the database 17.

Figure 2:
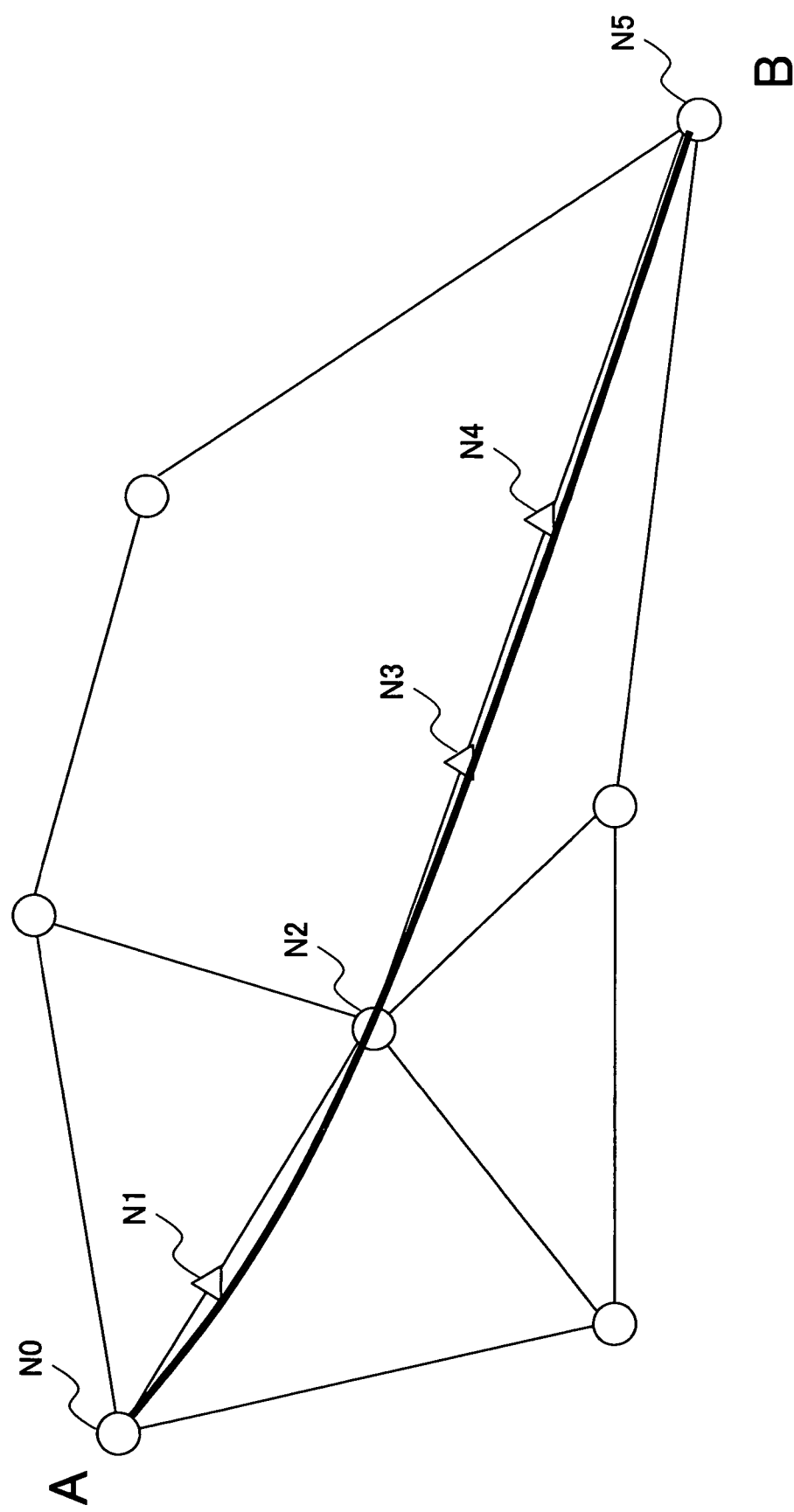
FIG. 2 is a simplified map showing an example of an optical network to which a wavelength dispersion compensation design method of the present invention is applied.
Figure 3:
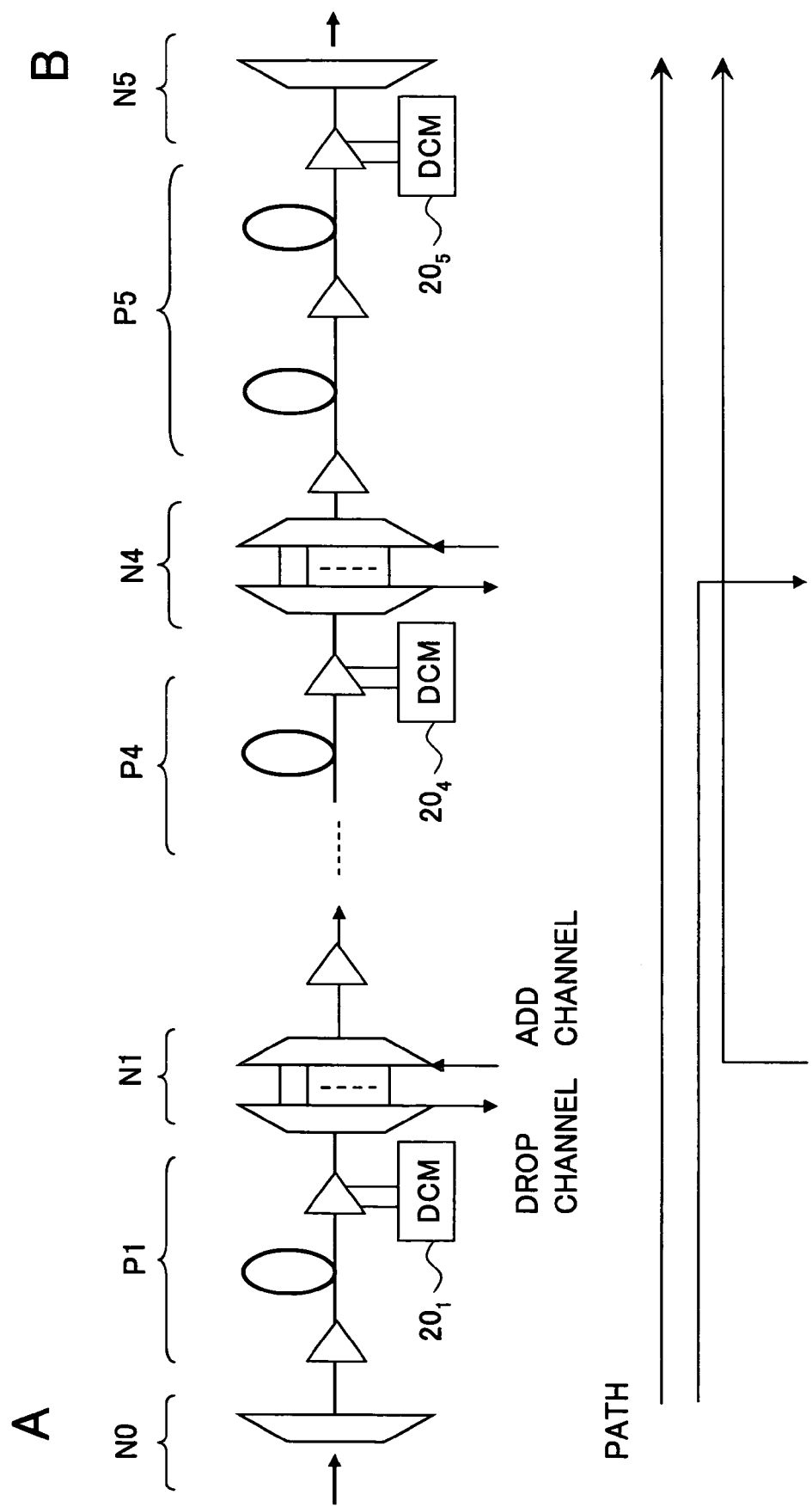
FIG. 3 is a schematic diagram showing an extracted link.

FIG. 2 illustrates an example of an optical network to which a wavelength dispersion compensation design method of the present invention is applied. Here, a link (a section serving as design target) is extracted from the network as shown by a thick line from a node N0 (point A) to a node N5 (point B), for which link a wavelength dispersion compensation design is to be performed. As shown in FIG. 3, the extracted link that connects the node N0 and the node N5 consists of spans (relay sections) P1 through P5, and nodes N1 through N4 each including an OADM function. Wavelength dispersion compensators (DCM: Dispersion Compensation Module) $20_1$ through $20_5$ are arranged for the spans P1 through P5, respectively.

Figure 4:
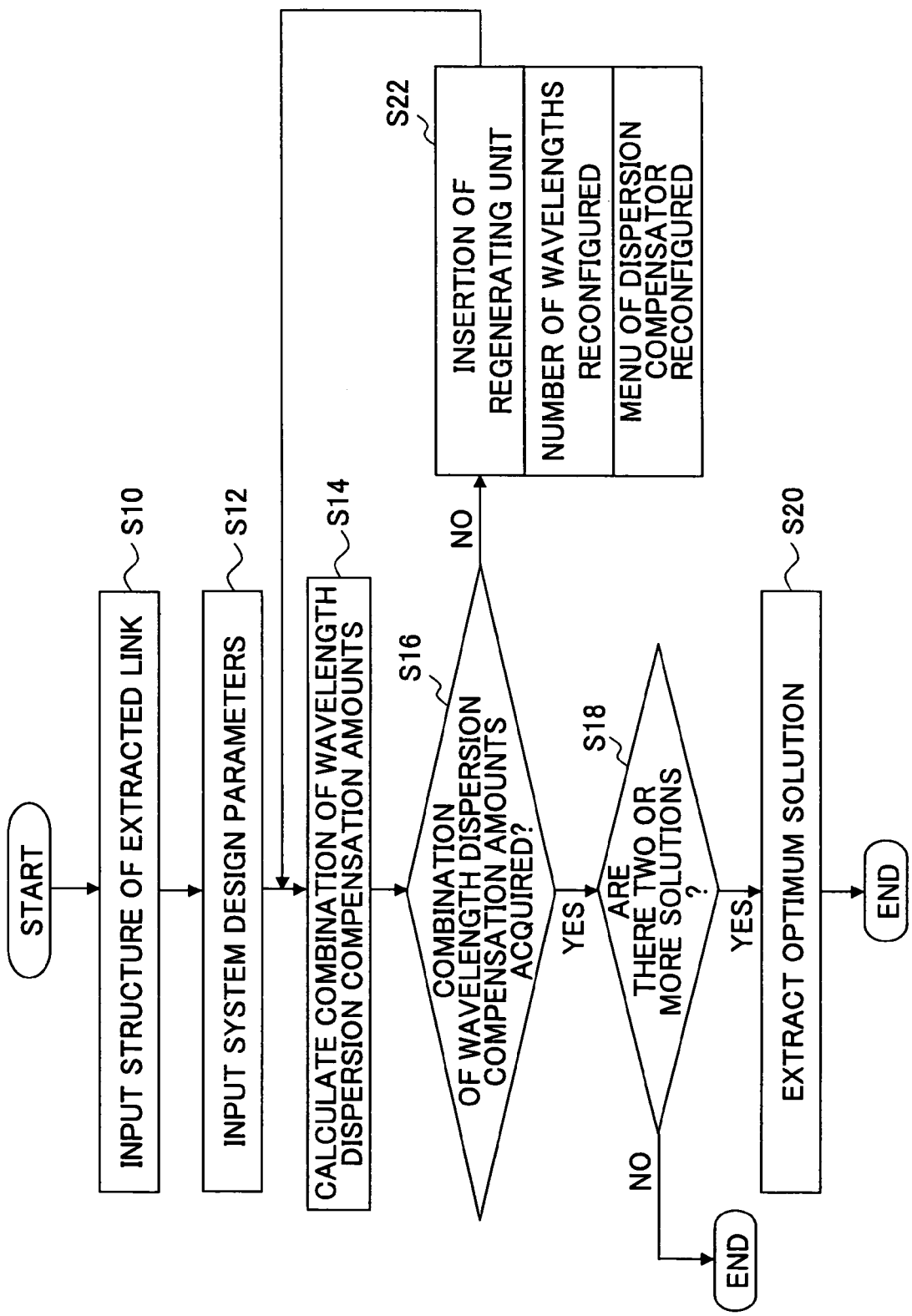
FIG. 4 is a flowchart according to the embodiment of the wavelength dispersion compensation design system of the present invention.

FIG. 4 is a flowchart of the wavelength dispersion compensation design system according to the embodiment of the present invention. At Step S10, the configuration of the extracted link is input from the inputting unit 11. Next, parameters for the system design are input at Step S12, the parameters including link structure, the number of spans, the number of OADM nodes with respective locations, wavelength dispersion of the transmission line, an amount of tolerable residual dispersion range, the upper limit and the lower limit of the residual dispersion value, the maximum error of the residual dispersion due to a dispersion slope, and a distribution of the amounts of wavelength dispersion due to manufacturing tolerances and temperature drifts of the transmission line and the dispersion compensators.

Here, the amount of the residual dispersion RD of a base wavelength is expressed as follows, where Df(n) represents the amount of wavelength dispersion of the base wavelength, and Dd(n) represents the amount of wavelength dispersion compensation for the base wavelength of the transmission line of each span, where n represents the transmission line number of a span, and takes the value of 0 or a positive integer, i.e., n=0, 1 and so on. In addition, Df(n) and Dd(n) have reverse signs.

$$RD=Df(n)+Dd(n)$$

In each path, if the length of the transmission line where the path passes and transmission line input power are given, a tolerable amount of the residual dispersion that satisfies a given transmission characteristic takes a certain range according to a predetermined tolerable amount of transmission degradation due to the wavelength dispersion. For example, for a Q value serving as an index of the transmission characteristic, suppose the Q value is tolerated to degrade by 1 dB. Further, conditions of the network being serviceable are defined by an upper limit of the tolerable residual dispersion range RD_tol_max(i, f, s), and a lower limit RD_tol_min(i, f, s). Here, "i" represents the starting node number of the path, "f" represents the terminating node number of the path, and "s" represents the number of transmission spans.

The amount of wavelength dispersion differs with wavelengths even in the same transmission line due to dispersion slope of the transmission line and the wavelength dispersion compensators. For this reason, the residual dispersion RD varies with different wavelengths, the variance being called error hereinafter. The maximum error and the minimum error of RD due to the dispersion slope are expressed by $\sigma_\lambda\_max$ (i, f, s) and $\sigma_\lambda\_min$ (i, f, s), respectively.

Figure 5:
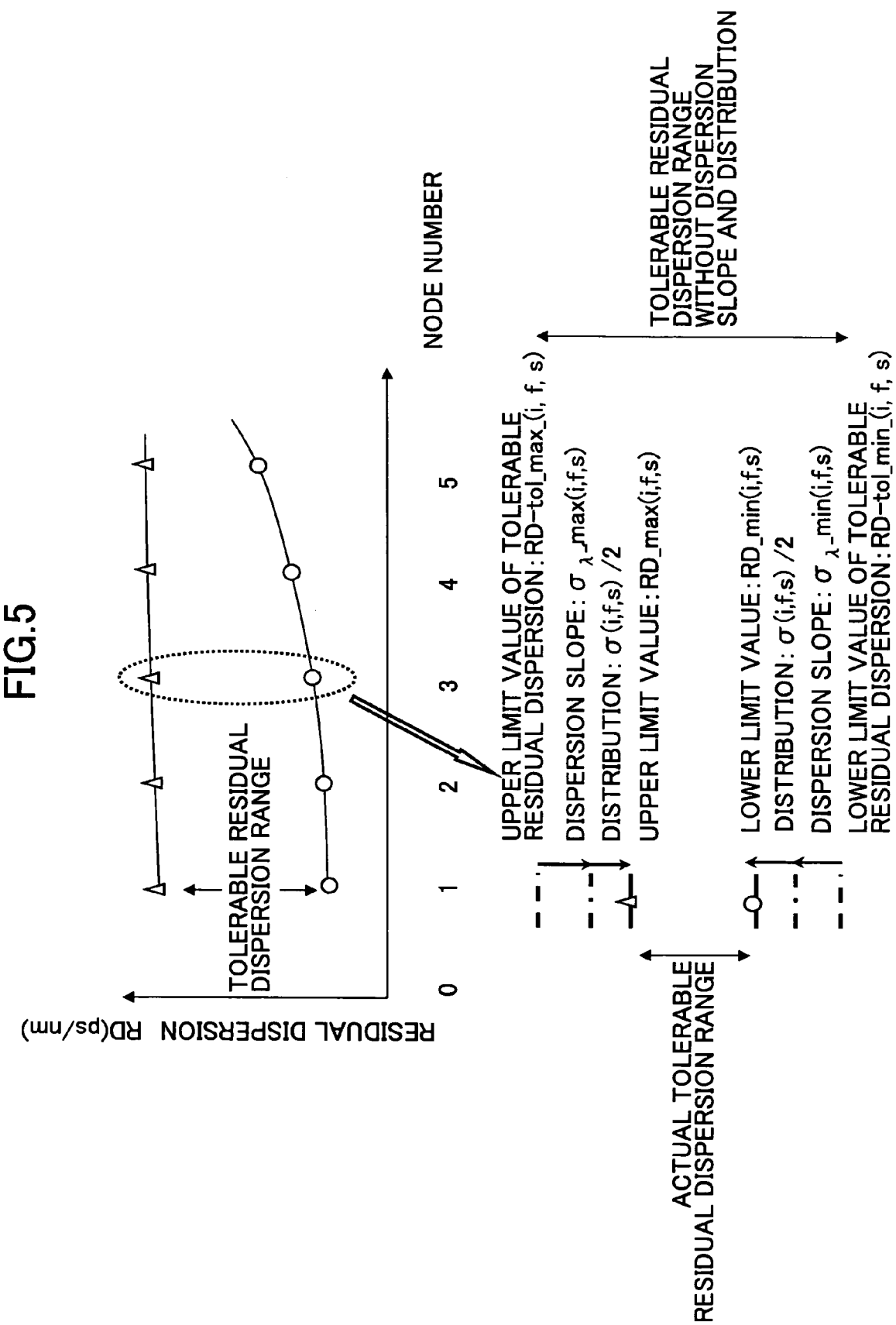
FIG. 5 is a graph explaining a tolerable residual dispersion range.

Further, the distribution of the wavelength dispersion due to manufacturing tolerance and temperature drift of the transmission line and the dispersion compensators is expressed by $\sigma$ (i, f, s). Then, FIG. 5 shows the tolerable residual dispersion range defined by the upper limit RD_tol_max(i, f, s) and the lower limit RD_tol_min(i, f, s), the same that is reduced by $\sigma_\lambda\_max$(i, f, s), $\sigma_\lambda\_min$(i, f, s), and $\sigma$(i, f, s), resulting in an actual tolerable residual dispersion range delimited by an upper limit RD_max(i, f, s) and a lower limit RD_min(i, f, s) That is, the tolerable residual dispersion range is reduced due to the dispersion slope. Further, since the dispersion slope and the distribution (due to the transmission line and the dispersion compensators) are independent, the range is further reduced due to the distribution. The greater the number of spans, the narrower the tolerable residual dispersion range becomes.

Now, the tolerable residual dispersion that satisfies the predetermined limits for all the paths (transmission sections) can be obtained by solving the following formulas (1) and (2) with reference to Dd(n) using the parameters. That is, what is necessary is to search for combinations of Dd(n) that fill the following simultaneous inequality (3) for each path at Step S14 of FIG. 4.

$$\text{RD\_tol\_max}(i, f, s) > \sum_{n=i+1}^{f} (Df(n) + Dd(n)) + \sigma_\lambda\_\max(i, f, s) + \frac{\sigma(i, f, s)}{2}. \quad (1)$$

$$\text{RD\_tol\_min}(i, f, s) < \sum_{n=i+1}^{f} (Df(n) + Dd(n)) - \sigma_\lambda\_\min(i, f, s) - \frac{\sigma(i, f, s)}{2}. \quad (2)$$

$$\text{RD\_tol\_min}(i, f, s) - \sum_{n=i+1}^{f} (Df(n)) + \sigma_\lambda\_\min(i, f, s) + \frac{\sigma(i, f, s)}{2} < \sum_{n=i+1}^{f} (Dd(n)) < \text{RD\_tol\_max}(i, f, s) - \sum_{n=i+1}^{f} (Df(n)) - \sigma_\lambda\_\min(i, f, s) - \frac{\sigma(i, f, s)}{2} \quad (3)$$

At Step S16 of FIG. 4, it is determined whether there is a solution to the simultaneous inequality. If affirmative, it is determined whether there are two or more solutions at Step S18. If negative, i.e., only one solution is available, the process is ended. If affirmative, i.e., there are two or more solutions to the simultaneous inequality, the solutions representing two or more combinations of the amounts of wavelength dispersion compensation, an optimum solution is extracted at Step S20, and the process is ended.

As for obtaining the optimum solution, there are two methods available as follows. According to the first method, a combination of the amounts of wavelength dispersion compensation and the residual dispersion amount of the longest path (with the smallest tolerable residual dispersion range) which combination becomes the closest to the center of the tolerable residual dispersion range is determined to be the optimum solution. According to the second optimum solution determining method, residual dispersion values of the paths of each combination of the amounts of wavelength dispersion compensation are averaged, and a combination, the average of which is the closest to the center of the tolerable residual dispersion range, is determined to be the optimum solution.

On the other hand, when there is no solution to the simultaneous inequality (i.e., when there is no combination of the amounts of wavelength dispersion compensation that suffices for the predetermined condition of the network being serviceable), the set up is reconfigured at Step S22, and then Step S14 is repeated. There are three methods of reconfiguration performed at Step S22 as follows. According to the first reconfiguration method, the OADM node closest to the receiving terminal station is replaced by a regenerating unit (Reg), being equivalent to configuring a link that is one span shorter, and the simultaneous inequality is re-calculated for all the paths.

Here, the regenerating unit (Reg) demultiplexes a received WDM optical signal, converts the signal to an electrical signal of each wavelength, further converts the electrical signal into an optical signal of optical signals of different wavelengths, multiplexes these optical signals, and outputs a WDM signal.

According to the second reconfiguration method, the number of wavelengths in the path is reduced, narrowing the band width used by each path, and decreasing absolute values of the maximum and the minimum residual dispersion RD due to the wavelength dispersion slope, namely, $\sigma_\lambda\_max$ (ps/nm) and $\sigma_\lambda\_min$ (ps/nm), respectively. In this way, the error of the residual dispersion RD is reduced and the tolerable residual dispersion range is expanded.

According to the third reconfiguration method, a menu of the dispersion compensators is reconfigured. This is applicable to the case wherein the difference between the amount of wavelength dispersion compensation that is required and the amount of necessary wavelength dispersion compensation that is obtained is small, which is the case wherein a solution is available if the amount of wavelength dispersion compensation of the dispersion compensators is adjusted in smaller steps.

The first through the third reconfiguration methods may be independently carried out, or combined as desired. However, selection of the methods depends on the system to design and given conditions; accordingly, method selection is carried out in consideration of limitations of the design, an influence on cost, etc.

Figure 6:
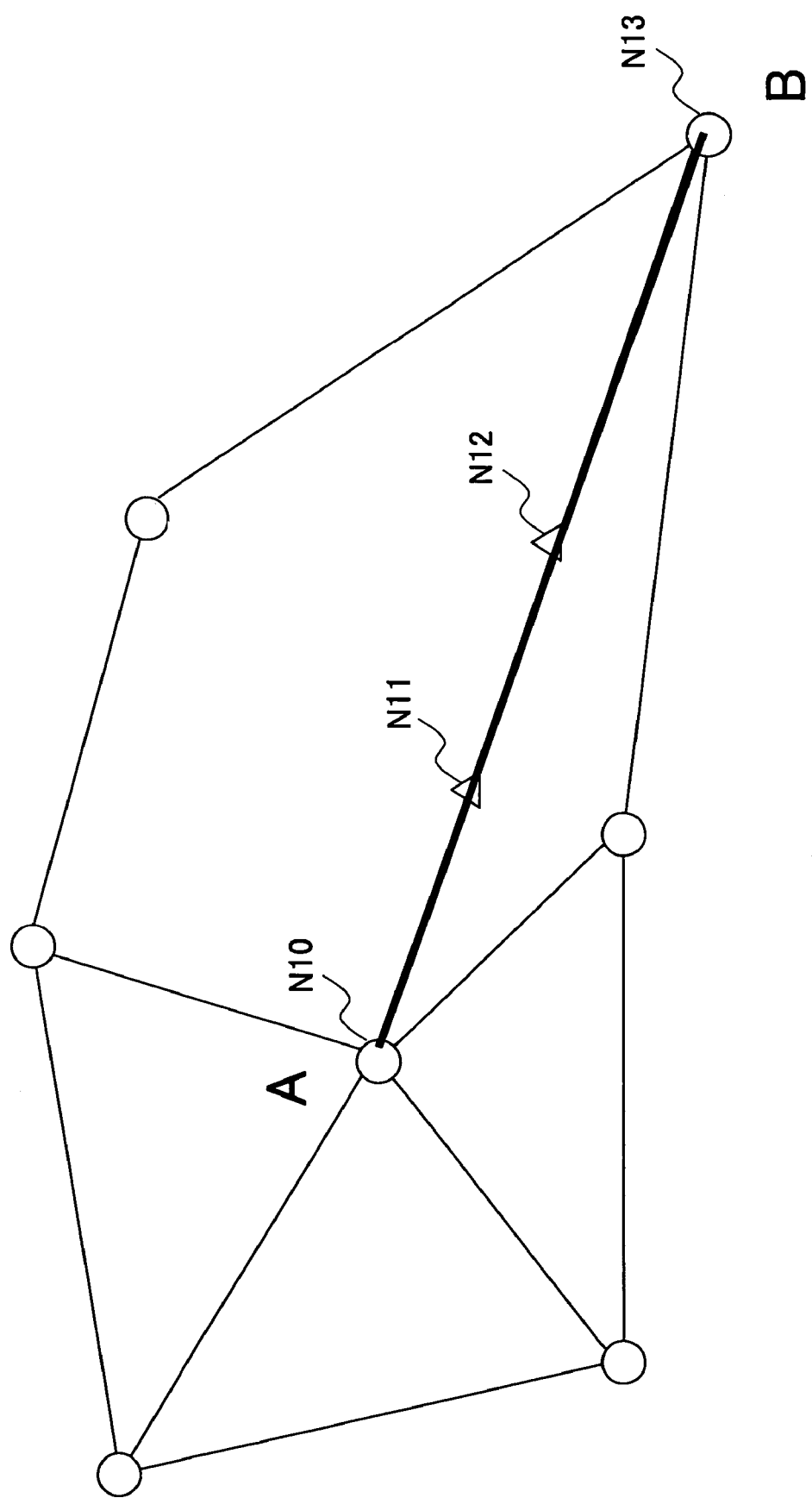
FIG. 6 is a simplified map showing the first embodiment of the optical network to which the method of the present invention is applied.
Figure 7:
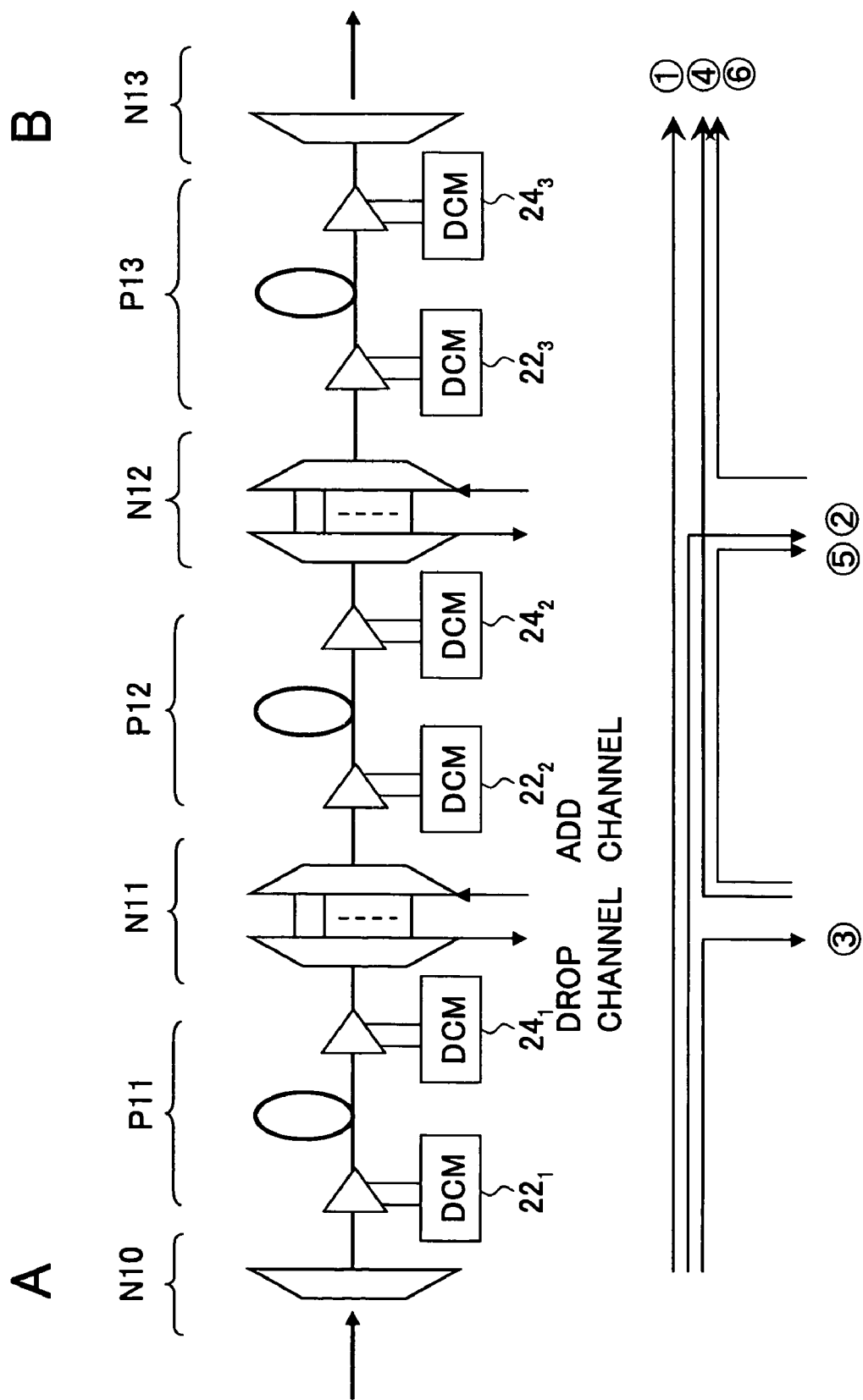
FIG. 7 is a schematic diagram of an extracted link.

Next, the first embodiment is described, wherein a wavelength dispersion compensation design is performed for a link that is extracted from an optical network as shown in FIG. 6. Here, the extracted link is from a node N10 (point A) to a node N13 (point B) as indicated by a thick line. The extracted link consists of three spans P11, P12, and P13 that connect the starting node N10 and the terminating node N13, and nodes N11 and N12 that are each equipped with OADM functions as shown in FIG. 7.

The spans P11 through P13 include wavelength dispersion compensators $22_1$ through $22_3$, respectively, and wavelength dispersion compensators $24_1$ through $24_3$, respectively. Here, the first wavelength dispersion compensators $22_1$ through $22_3$ are connected on the upper stream side of the corresponding spans, the latter ones being provided on the down stream side of the corresponding spans. Then, the total amount Dd(n) of wavelength dispersion compensation for each span is expressed as Dd(n)=DdCT(n)+DdCR(n). Here, DdCT(n) represents an amount of wavelength dispersion compensation of the upstream wavelength dispersion compensator, and DdCR(n) represents an amount of wavelength dispersion compensation of the downstream wavelength dispersion compensator.

Further, the amount of wavelength dispersion compensation of each span is expressed by Dd(1) through Dd(3). At this time, there are six paths conceivable as follows. (Path numbers are encircled in FIGS. 7 and on.

Path (1): From node N10 to node N13
Path (2): From node N10 to node N12
Path (3): From node N10 to node N11
Path (4): From node N11 to node N13
Path (5): From node N11 to node N12
Path (6): From node N12 to node N13

The amounts of wavelength dispersion compensation are to be set up so that the residual dispersion amount falls within the tolerable residual dispersion range in each section of all the Paths. Here, the amounts of wavelength dispersion at the base wavelength in the transmission line of the spans P11 through P13 are expressed as Df(1), Df(2), and Df(3), respectively, and example values thereof are as shown in FIG. 8.

Further, the parameters are set, for example, as shown in FIG. 9, the parameters being the upper limit RD_tol_max (ps/nm) and the lower limit RD_tol_min (ps/nm) of the tolerable residual dispersion range, the maximum $\sigma_\lambda$_max (ps/nm) and the minimum value $\sigma_\lambda$_min (ps/nm) of RD error due to the wavelength dispersion slope in the band used by each path, and σ (ps/nm) that is fluctuation of the amount of wavelength dispersion due to temperature change of the transmission line and the dispersion compensators, etc.

The formulas (1) and (2) concerning each of Paths (1) through (6) are rewritten and applied as follows.}

About Path (1):

RD_tol_max(0, 3, 3)−{Df(1)+Df(2)+Df(3)}−ρ$_\lambda$_max(0, 3, 3)−σ(0, 3, 3)/2>Dd(1)+Dd(2)+Dd(3)

RD_tol_min(0, 3, 3)−{Df(1)+Df(2)+Df(3)}+σ$_\lambda$_min(0, 3, 3)+σ(0, 3, 3)/2<Dd(1)+Dd(2)+Dd(3)

About Path (2):

RD_tol_max(0, 2, 2)−{Df(1)+Df(2)}−σ$_\lambda$_max(0, 2, 2)−σ(0, 2, 2)/2>Dd(1)+Dd(2)

RD_tol_min(0, 2, 2)−{Df(1)+Df(2)}+σ$_\lambda$_min(0, 2, 2)+σ(0, 2, 2)/2<Dd(1)+Dd(2)

About Path (3):

RD_tol_max(0, 1, 1)−Df(1)−σ$_\lambda$_max(0, 1, 1)−σ(0, 1, 1)/2 >Dd(1)

RD_tol_min(0, 1, 1)−Df(1)+σ$_\lambda$_min(0, 1, 1)+σ(0, 1, 1)/2<Dd(1)

About Path (4):

RD_tol_max(2, 3, 2)−{Df(2)+Df(3)}−σ$_\lambda$_max(2, 3, 2)−σ(2, 3, 2)/2>Dd(2)+Dd(3)

RD_tol_min(2, 3, 2)−{Df(2)+Df(3)}+σ$_\lambda$_min(2, 3, 2)+σ(2, 3, 2)/2<Dd(2)+Dd(3)

About Path (5):

RD_tol_max(1, 2, 1)−Df(2)−σ$_\lambda$_max(1, 2, 1)−σ(1, 2, 1)/2>Dd(2)

RD_tol_min(1, 2, 1)−Df(2)+π$_\lambda$_min(1, 2, 1)+σ(1, 2, 1)/2<Dd(2)

About Path (6):

RD_tol_max(2, 3, 1)−Df(3)−σ$_\lambda$_max(2, 3, 1)−σ(2, 3, 1)/2>Dd(3)

RD_tol_min(2, 3, 1)−Df(3)+σ$_\lambda$_min(2, 3, 1)+σ(2, 3, 1)/2<Dd(3)

Then, the values presented in FIG. 8 and FIG. 9 are applied to the inequalities of the six Paths, and the following are obtained.

−1680<Dd(1)+Dd(2)+Dd(3)<−1520

−1330<Dd(1)+Dd(2)<−870

−1530<Dd(2)+Dd(3)<−1070

−1055<Dd(1)<−345

−1155<Dd(2)<−445

−1255<Dd(3)<−545

Then, Dd(1), Dd(2), and Dd(3) that suffice for the above inequalities to be obtained. For example, Dd(1)=−500 (ps/nm)

Dd(2)=−550 (ps/nm)

Dd(3)=−600 (ps/nm)

suffice for the inequalities, i.e., the wavelength dispersion of all the Paths (1) through (6) shown in FIG. 7 fall within the tolerable residual dispersion range, and a serviceable system is successfully designed.

Next, the reconfiguration method in the case that there is no solution to the inequalities is described. When applying the first reconfiguration method, the link of the three spans is redefined as a link with two spans by replacing the OADM apparatus of the node N12 shown in FIG. 7 with a regenerating unit (Reg). Then, the number of the Paths becomes three. Simultaneous inequalities of the three Paths are calculated, and the network can be designed. When there is no combination of the amounts of wavelength dispersion compensation that meets the conditions in spite of the redefinition, a re-calculation is performed by further redefining the link to have only one span.

Next, an application of the second reconfiguration method is described, wherein the band used by each path is narrowed by reducing the number of wavelengths in the Path such that the absolute values of the A_max (ps/nm) and σ$_\lambda$_min (ps/nm) are reduced, the values being associated with the residual dispersion RD due to the wavelength dispersion slope. The dispersion slope of a single mode fiber (SMF) used as the transmission line is 0.06 ps/nm²/km. Since a rate of dispersion slope compensation of a fiber for dispersion compensation (DCF: Dispersion Compensation Fiber) is about 80%, the residual dispersion error turns into about 20% of the dispersion due to the dispersion slope in the transmission line.

If channel spacing is set at 100 GHz, and the length of the transmission line is set at 100 km, the dispersion error due to the dispersion slope of an adjacent channel is 0.06 ps/nm$^2$/km×0.8 nm×100 km=4.8 ps/nm.

When the length of the transmission line is set at 500 km, 0.06 ps/nm$^2$/km×0.8 nm×500 km=24.0 ps/nm.

Further, if five wavelengths are curtailed, the value of the 100 km long transmission line becomes 0.06 ps/nm$^2$/km×0.8 nm×100 km×5=24.0 ps/nm.

As for the 500 km long transmission line, the value is 0.06 ps/nm$^2$/km×0.8 nm×500 km×5=120.0 ps/nm.

That is, the residual dispersion error for the transmission line lengths of 100 km and 500 km can be eased by 4.8 ps/nm and 24.0 ps/nm, respectively.

For example, the amount Dd(i) of the wavelength dispersion compensation is required to suffice for −545 ps/nm< Dd(i)<−515 ps/nm in the case of Path i that is 500 km long. At this time, the amount Dd(i)' of the wavelength dispersion compensation required is expanded to −569 ps/nm< Dd(i)'<−515 ps/nm by curtailing the five wavelengths on the short wavelength side.

Next, the third reconfiguration method is described wherein the dispersion compensator menu is reconfigured. This is effective when the difference between the required amount of wavelength dispersion compensation and the obtained amount of wavelength dispersion compensation is small, and a solution can be obtained if the amount of wavelength dispersion compensation is adjusted in smaller steps.

For example, suppose that the required amount Dd(i) of the wavelength dispersion compensation of a certain Path (i) is −545 ps/nm <Dd(i) <−515 ps/nm. Usually, the dispersion compensators are adjustable in steps of 50 ps/nm or 100 ps/nm. Then, according to the present embodiment, the dispersion compensators are made capable of being adjusted in steps of 25 ps/nm. Thus, the smaller step can provide a solution to the inequalities.

Figure 10:
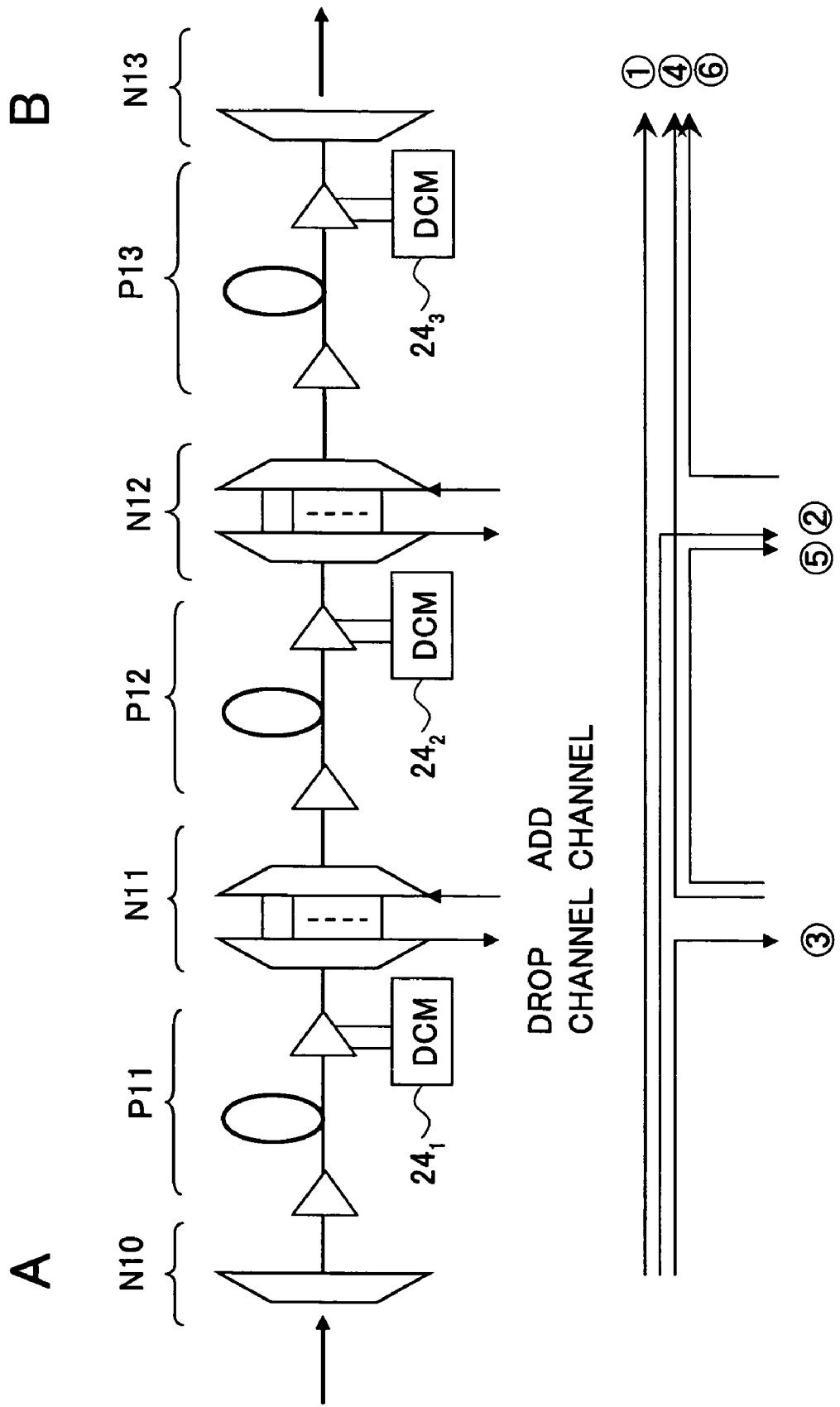
FIG. 10 is a schematic diagram of an extracted link.

In addition, Dd(n) can be calculated if there are only the downstream wavelength dispersion compensators $24_1$ through $24_3$ as shown in FIG. 10, instead of as shown in FIG. 7. In this case, Dd(n) is made equal to DdCR(n). Similarly, Dd(n) can be calculated if there are only upstream wavelength dispersion compensators $22_1$ through $22_3$.

Figure 11:
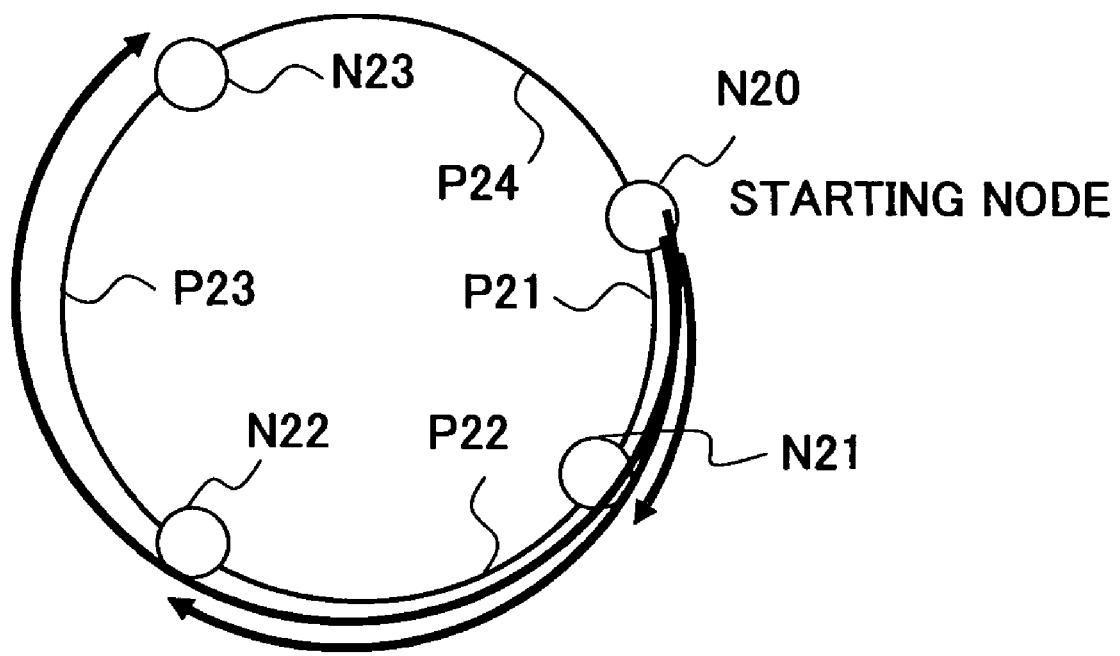
FIG. 11 is a simplified map showing a ring-structured system according to the second embodiment, to which the method of the present invention is applied.

Next, the second embodiment is described with reference to FIG. 11, which is a ring configuration system. The ring system includes four spans P21 through P24, and nodes N20 through N23 each having OADM functions. There is no regenerating unit among the nodes N20 through N23.

Figure 12:
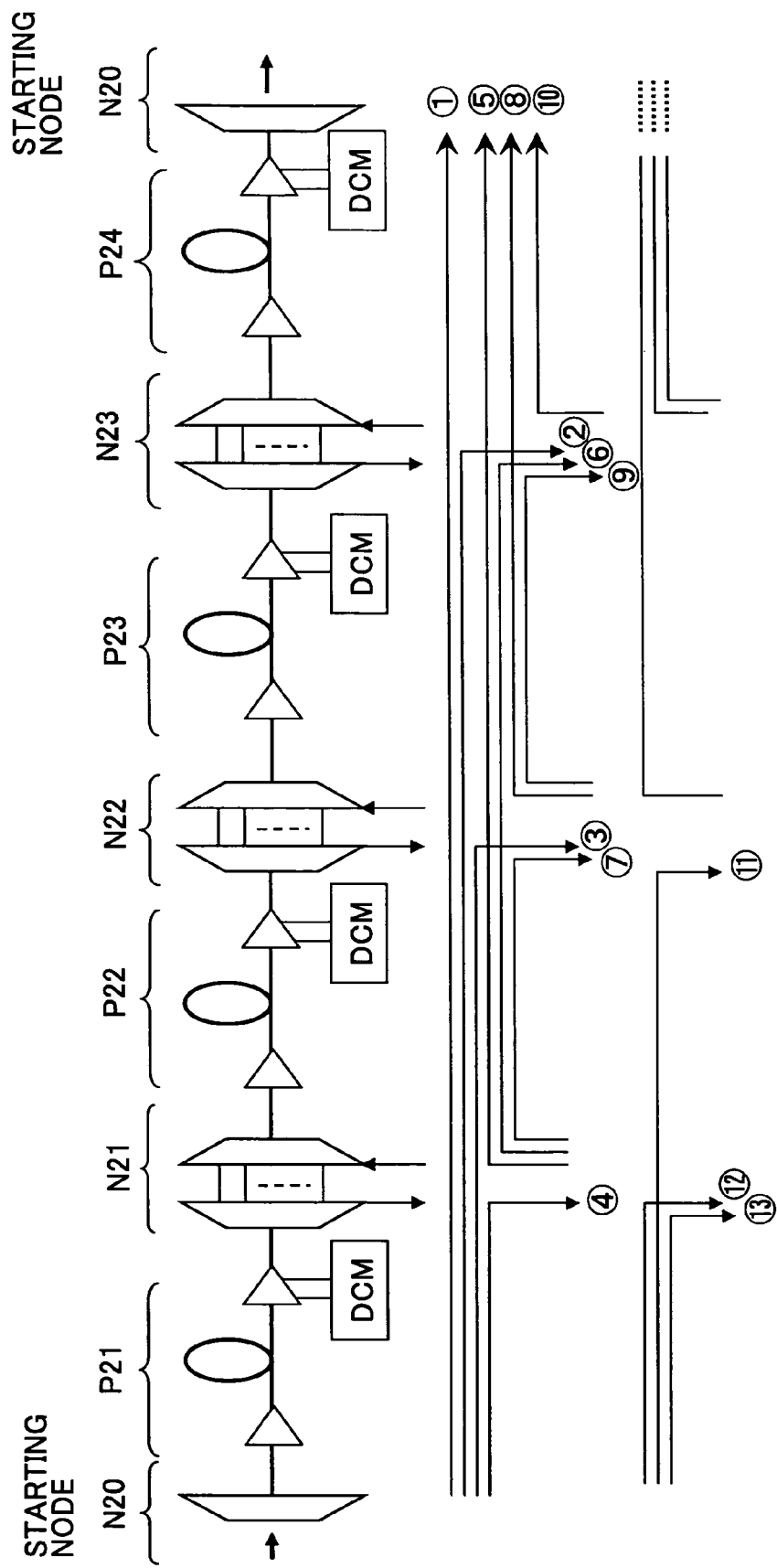
FIG. 12 is a schematic diagram of an extracted link.

In this case, if the node N20, for example, serves as the starting node and the terminating node, Paths are conceived as shown in FIG. 12. Paths are extracted by making each node into the starting node and the terminating node, and Paths (1) through (13) are obtained as shown in FIG. 12. Here, Path (1) that starts at the node N20 and returns to the node N20 may be defined as not existing. In this case, the number of the Paths is 12, and 12 simultaneous inequalities are to be solved for obtaining the amounts of wavelength dispersion compensation of the spans.

Where "i" represents a node number, "s" represents the number of the spans, and "M" represents the number of spans to which a dispersion compensator is provided, concerning the formulas (1) and (2), the number of simultaneous inequalities is equal to the number of combinations expressed by $0<=i<=M-1$ $1<=s<=M-1$.

In addition, when the number of nodes equipped with an OADM function is expressed by AD, the number of simultaneous inequalities is expressed by AD×(AD-1).

Figure 13:
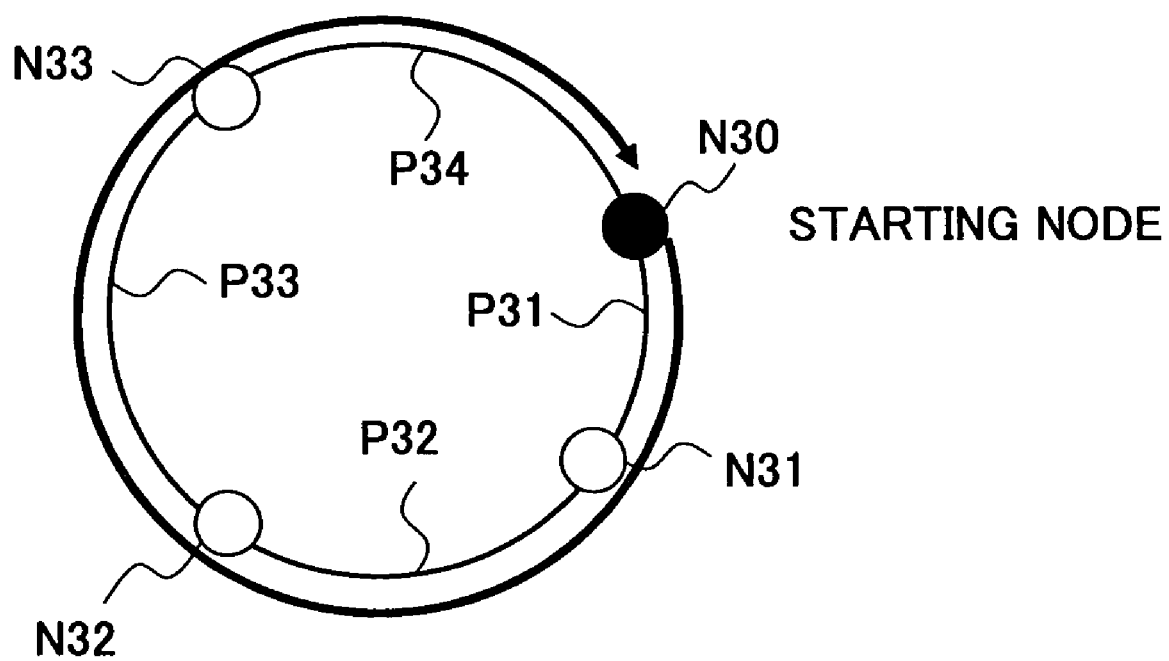
FIG. 13 is a simplified map showing a ring configuration system according to the third embodiment, to which the method of the present invention is applied.

Next, the third embodiment is described with reference to FIG. 13, which is another ring configuration system and is equipped with a regenerating unit. The ring system includes four spans P31 through P34, and three nodes N31 through N33 each have an OADM function, while the node N30 is a regenerating unit (Reg).

Figure 14:
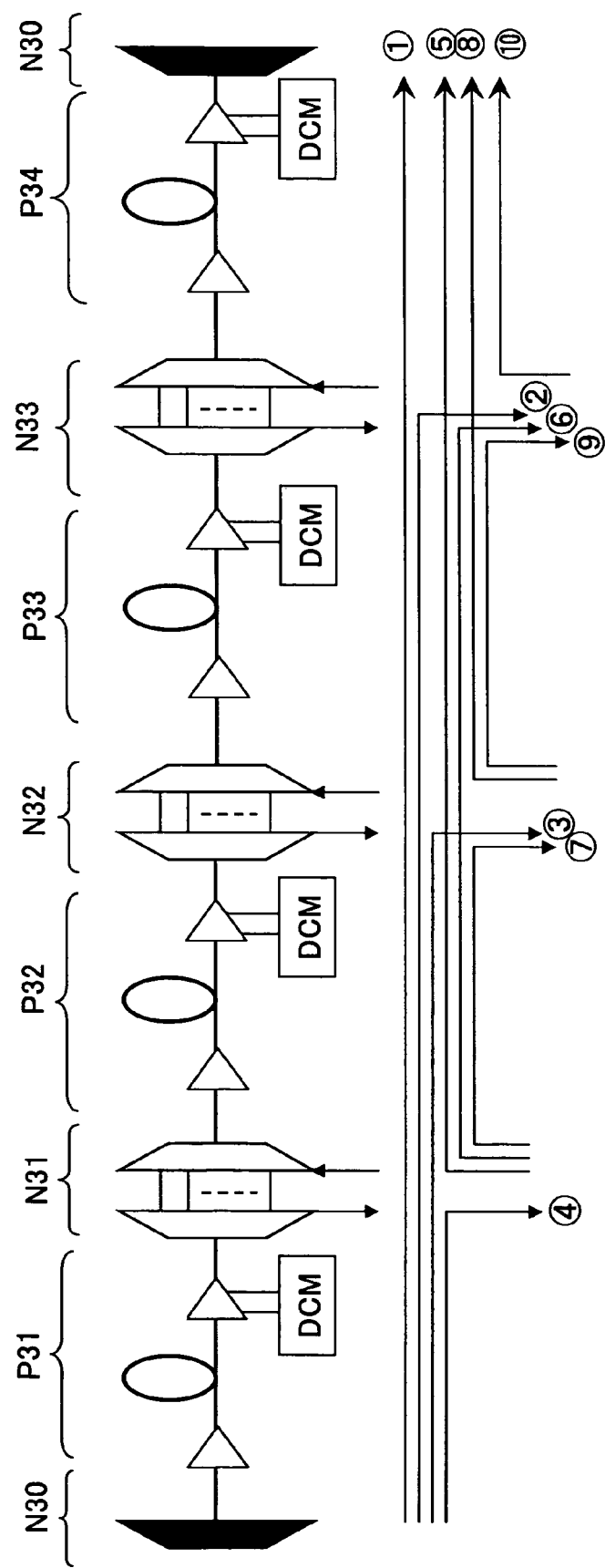
FIG. 14 is a schematic diagram of an extracted link.

At this time, the node N30 is made into the starting node and the terminating node, and Paths are developed as shown in FIG. 14. As shown in FIG. 14, Paths (1) through (10) are extracted. Here, Path (1) starting at N30 and terminating at N30 can be defined as not existing. In this case, the number of Paths is nine, and nine simultaneous inequalities are to be solved to obtain the amounts of wavelength dispersion compensation of the spans.

Where "i" represents a node number, "s" represents the number of the spans, and "M" represents the number of spans to which a dispersion compensator is provided, concerning the formulas (1) and (2), the number of simultaneous inequalities is equal to the number of combinations expressed by if $i=0$ $1<=s<=M$ if $i \neq 0$ $1<=s<=M-i$.

Here, if the number of nodes equipped with the OADM function is expressed by AD, the number of simultaneous inequalities to be solved is expressed by the following formula.

$$\sum_{i=1}^{AD+1}(AD+1-i)$$

Figure 15:
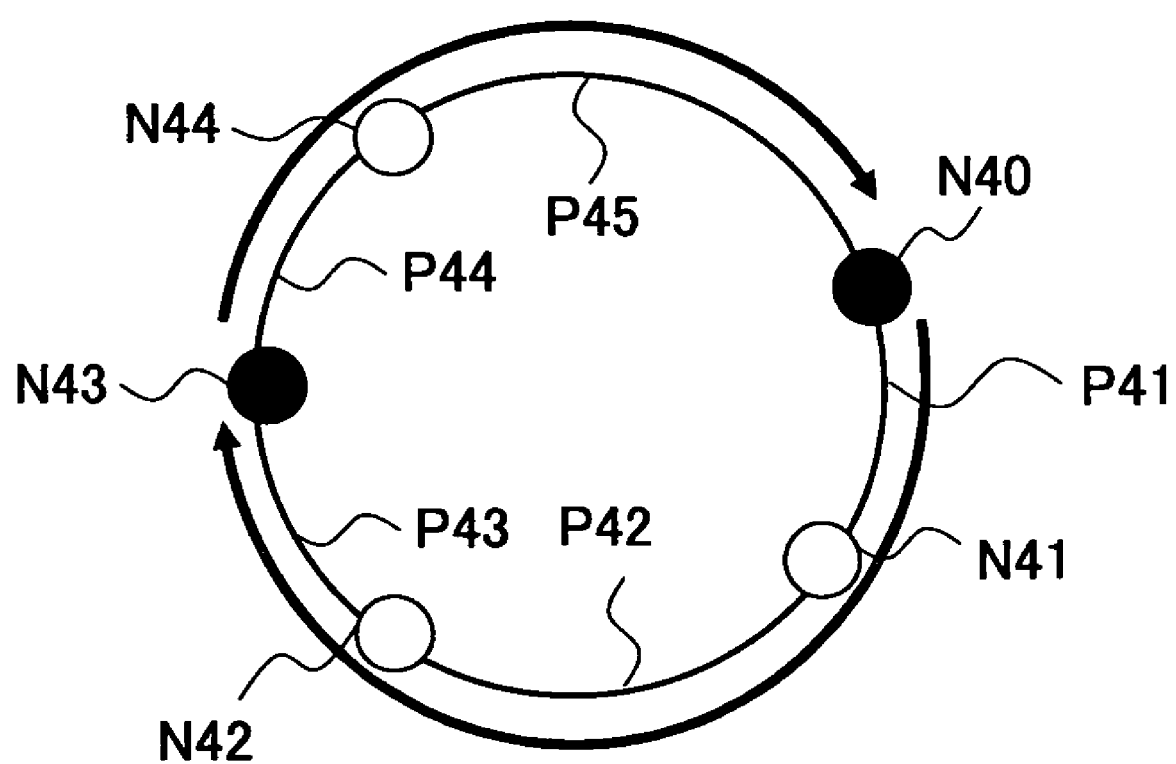
FIG. 15 is a simplified map showing a ring-structured system according to the fourth embodiment, to which the method of the present invention is applied.

Next, the fourth embodiment is described with reference to FIG. 15, which is another ring configuration system equipped with two regenerating units. The system includes five spans P41 through P45, and three nodes N40, N42, and N44 each with the OADM function, wherein the nodes N40 and N43 are regenerating units (Reg).

Figure 16:
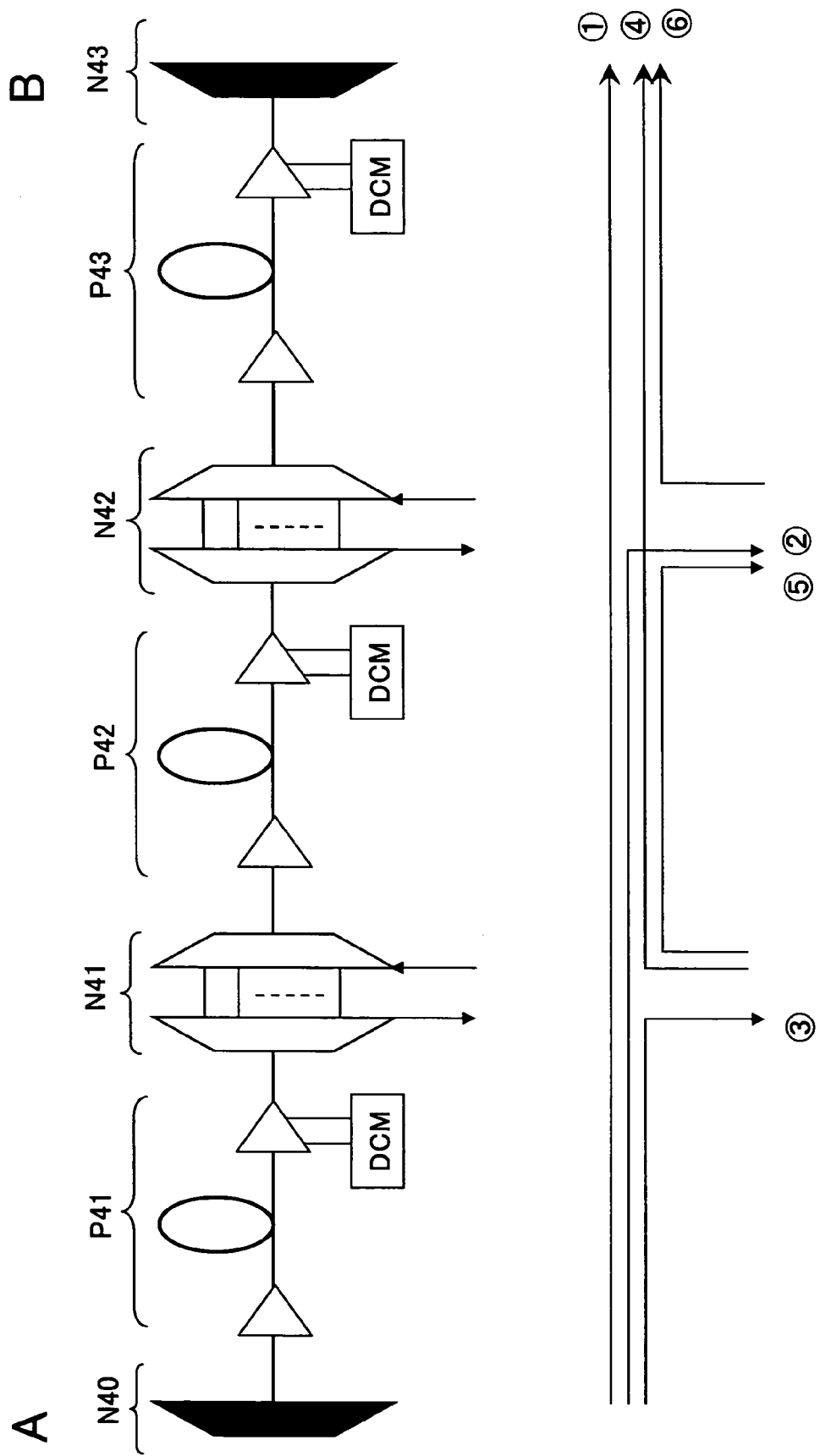
FIG. 16 is a block diagram of an extracted link.

At this time, the node N40 equipped with the regenerating unit is made into the starting node, the node N43 equipped with the regenerating unit is made into the terminating node, and Paths are developed as shown in FIG. 16. As shown in FIG. 16, Paths (1) through (6) are extracted, and six simultaneous inequalities are to be solved for obtaining the amounts of wavelength dispersion compensation for the spans.

Then, the node N43 equipped with the regenerating unit is made into the starting node, and the node N40 equipped with the regenerating unit is made into the terminating node. Then, three Paths are conceivable, and accordingly three simultaneous inequalities are solved to obtain the amounts of wavelength dispersion compensation for the spans.

As described above, according to the wavelength dispersion compensation design method of the present invention, the common and formulized optimization of the amounts of wavelength dispersion compensation can be performed for a point-to-point transmission system and a ring configuration system, and the design time is shortened.

Further, the present invention is not limited to these embodiments, but variations and modifications may be made without departing from the scope of the present invention.

What is claimed is:

1. A wavelength dispersion compensation design method, comprising:

extracting a link out of an optical network, the link containing a plurality of spans and a plurality of nodes, each of the nodes including an add/drop function;

setting an amount of wavelength dispersion of a base wavelength of the spans from the extracted link, a tolerable residual dispersion range for all paths of the extracted link as a condition of the optical network being serviceable, an amount of error of residual dispersion, and an amount of distribution; and determining a combination of the amounts of wavelength dispersion compensation of wavelength dispersion compensators provided to the corresponding spans, the amounts sufficing for simultaneous inequalities that stipulate that all residual dispersion ranges of one or more paths that reach each of the nodes falls within the tolerable residual dispersion range.

2. The wavelength dispersion compensation design method as claimed in claim 1, the link further comprising configuring like a ring, and said extracting comprises making a desired node constituting the ring into a starting node and a terminating node.

3. The wavelength dispersion compensation design method as claimed in claim 2, wherein one of the nodes constituting the ring includes a regenerating unit, and said extracting comprises making the node into the starting node and the terminating node for extracting the paths.

4. The wavelength dispersion compensation design method as claimed in claim 2, wherein at least two of the nodes constituting the ring include a regenerating unit, and said extracting comprises making any one of the nodes equipped with the regenerating unit into the starting node, and making another node equipped with the regenerating unit into the terminating node for extracting the paths.

5. A wavelength dispersion compensation design system for a link extracted out of an optical network, the link containing a plurality of spans and a plurality of nodes equipped with an add/drop function, comprising:

an inputting unit for inputting an amount of wavelength dispersion of a base wavelength of the spans, a tolerable residual dispersion range of paths of the link, an amount of error of residual dispersion, and an amount of distribution; and a calculation unit for obtaining a combination of the amounts of the wavelength dispersion compensation of wavelength dispersion compensators provided to each of the spans, the amounts sufficing for simultaneous inequalities that stipulate that all residual dispersion ranges of all the paths that reach each node fall within the tolerable residual dispersion range set up for all the paths of the link as conditions that the optical network be serviceable.

6. The wavelength dispersion compensation design system as claimed in claim 5, further comprising a selection unit for selecting a combination of the amounts of residual dispersion compensation when there is a plurality of combinations obtained by the calculation unit, the selection being carried out such that the amount of residual dispersion of a path that is no shorter than others becomes close to a center value of the tolerable residual dispersion range.

7. The wavelength dispersion compensation design system as claimed in claim 5, further comprising a selection unit for selecting a combination of the amounts of residual dispersion compensation when there is a plurality of combinations obtained by the calculation unit, the selection being carried out such that an average of the amounts of residual dispersion of the paths becomes close to a center value of the tolerable residual dispersion range.

8. The wavelength dispersion compensation design system as claimed in claim 5, wherein the calculation unit replaces one of the nodes equipped with the add/drop function and being arranged closest to a receiving end by a node that includes a regenerating unit when no combination of the amounts of wavelength dispersion compensation is acquired.

9. The wavelength dispersion compensation design system as claimed in claim 5, wherein the calculation unit reduces the number of wavelengths in a path when no combination of the amounts of wavelength dispersion compensation is acquired.

10. The wavelength dispersion compensation design system as claimed in claim 5, wherein the calculation unit adjusts the amount of wavelength dispersion compensation of a wavelength dispersion compensator that is provided to each of the spans when no combination of the amounts of wavelength dispersion compensation is acquired.

11. A wavelength dispersion compensation design method, comprising:

extracting a link out of an optical network, the link containing a plurality of spans and a plurality of nodes, each of the nodes including an add/drop function;

setting an amount of wavelength dispersion of a base wavelength of the spans from the extracted link, a tolerable residual dispersion range for all paths of the extracted link as a condition of the optical network being serviceable; and determining a combination of the amounts of wavelength dispersion compensation of wavelength dispersion compensators provided to the corresponding spans, the amounts sufficing for simultaneous inequalities that stipulate that all residual dispersion ranges of one or more paths that reach each of the nodes falls within the tolerable residual dispersion range.

* * * * *